US011634367B2

(12) United States Patent
Yvin et al.

(10) Patent No.: US 11,634,367 B2
(45) Date of Patent: Apr. 25, 2023

(54) STIMULATION OF THE NITRIFICATION OF A SOIL WITH COMPOUNDS COMPRISING A PLANT EXTRACT

(71) Applicant: AGRO INNOVATION INTERNATIONAL, Saint-Malo (FR)

(72) Inventors: Jean-Claude Yvin, Saint-Malo (FR); Mustapha Arkoun, Saint-Malo (FR)

(73) Assignee: AGRO INNOVATION INTERNATIONAL, Saint-Malo (FR)

( * ) Notice: Subject to any disclaimer, the term of this patent is extended or adjusted under 35 U.S.C. 154(b) by 133 days.

(21) Appl. No.: 16/956,178

(22) PCT Filed: Dec. 21, 2018

(86) PCT No.: PCT/FR2018/053499
§ 371 (c)(1),
(2) Date: Jun. 19, 2020

(87) PCT Pub. No.: WO2019/122775
PCT Pub. Date: Jun. 27, 2019

(65) Prior Publication Data
US 2020/0331819 A1     Oct. 22, 2020

(30) Foreign Application Priority Data
Dec. 22, 2017   (FR) ...................................... 1763157

(51) Int. Cl.
*C05F 11/02*     (2006.01)
*C05D 3/02*     (2006.01)
*C05F 11/08*     (2006.01)

(52) U.S. Cl.
CPC ................ *C05F 11/02* (2013.01); *C05D 3/02* (2013.01); *C05F 11/08* (2013.01)

(58) Field of Classification Search
None
See application file for complete search history.

(56) References Cited

U.S. PATENT DOCUMENTS

2004/0234674 A1   11/2004   Eich et al.
2005/0197252 A1*   9/2005   Yamashita ............. A01N 63/27
                                                          504/103
(Continued)

FOREIGN PATENT DOCUMENTS

CN     105967848 A *   9/2016 ............. C05F 11/02
CN     107278752 A *   10/2017
(Continued)

OTHER PUBLICATIONS

Jafari et al. "Allelopathic Effects of *Chenopodium album* L. Extracts on Nitrification" Journal of Plant Nutrition, vol. 25, No. 3, Mar. 25, 2002, pp. 671-678.
(Continued)

*Primary Examiner* — Wayne A Langel
(74) *Attorney, Agent, or Firm* — MH2 Technology Law Group, LLP

(57) ABSTRACT

The invention relates to the use of an amendment composition comprising an extract of *Cynara* leaves for stimulating the nitrification of a soil, a process for stimulating the nitrification of a soil with an amendment composition comprising an extract of *Cynara* leaves and an amendment composition comprising an extract of *Cynara* leaves and one or more compound(s) selected from (i) a basic calcium amendment, (ii) a yeast extract, and (iii) an extract of a legume of the family Fabaceae.

12 Claims, 3 Drawing Sheets

Figure 1:
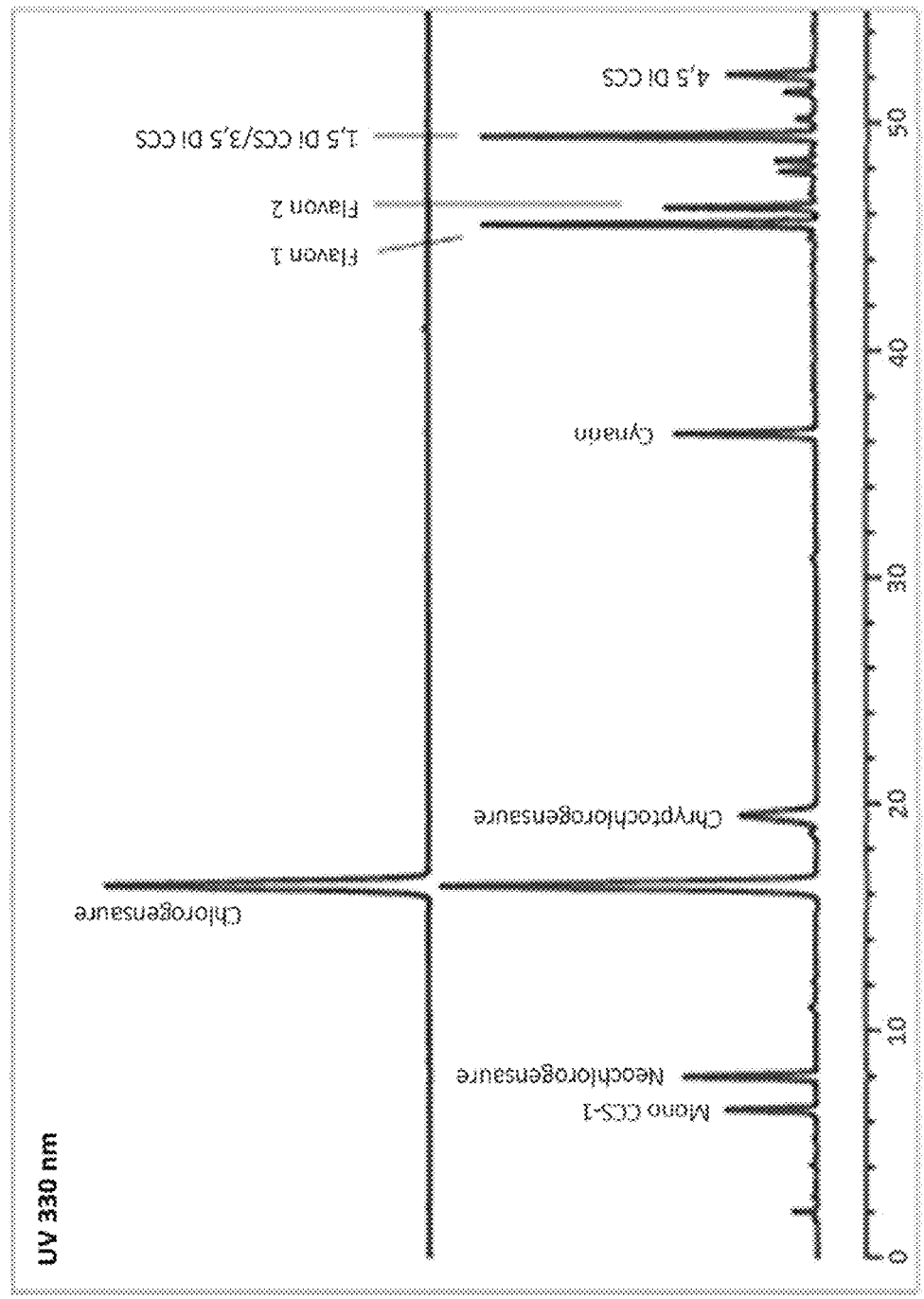

Specification includes a Sequence Listing.

(56) References Cited

U.S. PATENT DOCUMENTS

| | | | | |
|---|---|---|---|---|
| 2006/0084573 A1* | 4/2006 | Grech | ................... | C05B 17/00 |
| | | | | 504/101 |
| 2020/0390097 A1* | 12/2020 | Ben Kaab | .............. | A01N 43/42 |

FOREIGN PATENT DOCUMENTS

| | | | | | |
|---|---|---|---|---|---|
| CN | | 107318539 A | * | 11/2017 | ............ A01G 22/00 |
| CN | | 108485678 A | * | 9/2018 | ............ C09K 17/40 |
| EP | | 1967198 A1 | | 9/2008 | |
| WO | | 8909200 A1 | | 10/1989 | |
| WO | WO 2019/210929 A1 | | * | 11/2019 | ............ A01N 43/16 |

OTHER PUBLICATIONS

French Search Report issued in corresponding French Application No. 1763157 dated May 16, 2018, 3 pages.

International Search Report issued in corresponding International Application No. PCT/FR2018/053499 dated Mar. 29, 2019, 4 pages.

McCarty et al. "Effects of phenolic acids on ammonia oxidation by terrestrial autotrophic nitrifying microorganisms" FEMS Microbiology Letters, Wiley-Blackwell Publishing Ltd, vol. 85, No. 4, Jul. 1, 1991, pp. 345-349.

Terre-Net Media, "Homologation de L'Additif de L'activateur de sol Humiplus", Internet Citation, Aug. 7, 2017, XP002780974, https://www.terre-net.fr/observatoire-technique-culturale/appros-phytosanitaire/article/homologation-de-l-additif-de-l-activateur-de-sol-humiplus-216-129383.html (extracted May 4, 2018), 1 page.

* cited by examiner

STIMULATION OF THE NITRIFICATION OF A SOIL WITH COMPOUNDS COMPRISING A PLANT EXTRACT

CROSS REFERENCE TO RELATED APPLICATIONS

This application is the National Phase of PCT International Application No. PCT/FR2018/053499, filed on Dec. 21, 2018, which claims priority under 35 U.S.C. 119(a) to Patent Application No. 1763157, filed in France on Dec. 22, 2017, all of which are hereby expressly incorporated by reference into the present application.

SEQUENCE LISTING

The instant application contains a Sequence Listing which has been submitted electronically in ASCII format and is hereby incorporated by reference in its entirety. Said ASCII copy, created on 18 Jun. 2020 is named 1H294250_0027_Sequence Listing_ST25.txt and is 996 bytes in size.

TECHNICAL FIELD

The invention finds its application in the agro-ecological and agricultural field and relates in particular to the stimulation of the nitrification of a soil with compositions comprising a plant extract.

TECHNOLOGICAL BACKGROUND

Nitrogen fertilization plays an essential role in crop growth and yield. Nitrogen is the main component of amino acids and proteins, so it is a very important element for plant growth and quality. As it is subject to a natural cycle in the air, soil and water, nitrogen undergoes different chemical and biological transformations: this is the nitrogen cycle.

The global nitrogen cycle describes the transformations of gaseous nitrogen, inorganic nitrogen and nitrogen-rich organic compounds present on earth. It is a set of microbial processes controlled by soil microorganisms. These include assimilation, ammonification, nitrification, denitrification, biological nitrogen fixation and anaerobic oxidation of ammonia.

Of all these processes, nitrification is the most important biological step in the soil nitrogen cycle, and is considered a limiting step that can lead to low nitrogen use efficiency, which can contribute to groundwater pollution and the emission of greenhouse gases ($N_2O$). The rate of nitrification can vary according to the nature of the soil. Factors regulating the nitrification process include soil pH, temperature, moisture, nitrogen fertilizer applied to the soil, microorganisms and the physical nature of the soil.

Nitrification is the oxidation of ammonium ($NH_4^+$) to nitrate ($NO_3^-$). This nitrification goes through several stages. First, the bacteria and archaea of the group Nitrosomas, AOB (Ammonia-Oxidizing Bacteria) and AOA (Ammonia-Oxidizing archaea), oxidize ammonium to hydroxylamine ($NH_2OH$). The latter is taken up by Nitrite-Oxidizing Bacteria (NOB) to convert it to nitrite ($NO_2^-$). Finally, it is the *Nitrobacter* that oxidize the nitrite to nitrate ($NO_3^-$). In order to transform ammonium into nitrite, four protons are released as well as two water molecules, a phenomenon which causes soil acidification, particularly around the roots. The activity of AOB and AOA bacteria is strongly dependent on the environment; in particular moisture, pH, temperature and the availability of ammonium have a great influence. Nitrogen exists in different forms: in the free state as $N_2$, where it constitutes 78% of the air, and in the combined state, in inorganic or organic form.

Organic Nitrogen

Soil nitrogen reserves are found in the organic state in the form of humus or SOM (Soil Organic Matter), coming from crop residues or animal excreta. It is made up of various nitrogen compounds (proteins, amino acids, etc.), whose mineralization is highly variable and difficult to predict.

Inorganic Nitrogen

It comes from the decomposition of organic matter by the fauna and flora of the soil (mineralization process), or directly from the application of inorganic fertilizers. Inorganic nitrogen is composed of three main forms: urea, ammonium and nitrates.

Urea is a widely used source of nitrogen around the world. Although it can be directly absorbed by plants, it is most often hydrolyzed to ammonium ($NH_4^+$), a form that is more readily available to plants. This transformation is accompanied by an increase in soil pH and significant losses through volatilization ($NH_3$: gaseous ammonia), which causes air pollution.

Strict urea nutrition can lead to reduced growth and sometimes even the appearance of nitrogen deficiency.

Ammonium is one of the main sources of nitrogen for plants. At high concentrations, this element can be toxic to plants when it accumulates in tissues. Ammonium can be supplied as a fertilizer. Due to its positive charge, $NH_4^+$ binds to the clay-humus complex in the soil, limiting its instantaneous availability to the plant. As ammonium is fixed by the soil, it cannot move in the soil. Absorption by the plant can therefore only take place within a perimeter close to the root zone. The ions fixed between the clay sheets are for the most part oxidized by nitrifying bacteria (*Nitrobacter*, Nitrosomas . . . ) and transformed into nitrates. This is the nitrification process, which is accompanied by a decrease in the soil pH.

Nitrate is considered the majority and preferred nitrogen source by plants. In addition, the mobility of nitrate in the soil facilitates its uptake by plants. Therefore, most plants have a nitrophilic character. Nitrate, which carries a negative charge, is not retained by soil particles and therefore can be easily leached due to its solubility. It can also be reduced to nitrogen oxide gas by the denitrification process. On the other hand, because of its solubility, nitrate is easily carried by soil water to the roots, the mass flow phenomenon.

The nutritional value of each form of nitrogen is different from one form to another. In order of preference, plants absorb mainly nitrate ($NO_3^-$), then ammonium ($NH_4^+$), and to a lesser extent urea.

Plants grown on mixed nitrogen sources containing nitrate and urea or nitrate and ammonium, or on sources containing all three forms of nitrogen (urea, ammonium and nitrate), show better growth compared to plants grown on urea or ammonium alone.

Controlling the nitrification process and the transition from the ammoniacal form to the nitric form, to have both forms (ammonium and nitrate, or urea and nitrate) or all three forms (urea, ammonium and nitrate) is crucial to improve the efficiency of nitrogen use by plants, helping to increase yields while preserving the environment.

The nitrification rate in the soil has an important influence on the availability to plants of the different forms of inorganic nitrogen, mainly nitrate. The nitrification rate depends on several parameters such as moisture, pH, temperature and ammonium availability. Acidic soil pH, low humidity and cold temperatures decrease the nitrification rate. Alkaline soil pH, high humidity and warm temperatures increase the rate of nitrification.

Several types of nitrogen fertilizers are marketed, for example:
- Ammonium sulfate which, crystallized or granulated, gives a fertilizer called ammonium sulfate, often with a nitrogen content of up to 21%.
- Urea obtained by combining ammonia and the carbon dioxide formed during the synthesis of ammonia. Urea is a molecule widely present in the natural environment. It is a source of nitrogen for the growth of various organisms including bacteria, fungi and plants. Because of its high nitrogen content (46%) and low production cost, urea accounts for more than 50% of the total nitrogen fertilizers used in agriculture.
- Ammonium nitrate obtained by reaction between ammonia and nitric acid. This form has a total nitrogen content of 27%; 33.5% or 35%. It is composed of 50% nitrogen in the form of ammonium and 50% in the form of nitrate and is the most widely used product in France and Europe. Nitrate and ammonium are the main sources of nitrogen for plant growth.
- Nitrogen solution with 30% nitrogen by mass and 39% by volume. This type of fertilizer contains all three forms of nitrogen: 50% urea, 25% ammonia and 25% nitrate.

There is therefore a genuine need to develop compositions that allow the plant to use the nitrogen in fertilizer compositions more efficiently and to control the nitrification process, in particular to increase the nitrification rate and promote the rapid appearance of nitrates in the soil. All of this is intended to enable the plant to make better use of nitrogen, even under conditions that limit nitrification.

It is in this context that the applicant has demonstrated, and this constitutes the basis of the present invention, that compositions comprising an extract of *Cynara* leaf can be used to stimulate the nitrification of a soil, in particular a soil having an acid pH. These compositions enable the plant in particular to make more efficient use of the nitrogen present in the soil in order to obtain better crop productivity.

SUMMARY OF THE INVENTION

Thus, the present invention, which finds application in the agro-ecological and agricultural field, aims at proposing new compositions to stimulate the nitrification of a soil.

According to a first aspect, the invention relates to the use of a composition comprising an extract of *Cynara* leaves to stimulate the nitrification of a soil.

According to a second aspect, the invention relates to a process for stimulating the nitrification of a soil, characterized in that it comprises supplying said soil with an amendment composition comprising an extract of *Cynara* leaves.

According to a third aspect, the invention relates to an amendment composition comprising an extract of *Cynara* leaves and one or more compound(s) selected from:
- a basic calcium amendment,
- a yeast extract, and
- a legume extract from the family Fabaceae.

DETAILED DESCRIPTION OF THE INVENTION

The term "amendment composition" refers to a compound or set of compounds that can be used as a soil amendment.

An "amendment" or "soil amendment" is used to improve the agricultural quality of a soil. Amendments are used in agriculture to improve the productivity of soils, particularly acidic soils.

The term "basic calcium amendment" refers to an amendment rich in calcium carbonate, for example of marine or terrestrial origin. In the context of the invention, the basic calcium amendment can be a marine limestone amendment based on shell debris of marine organisms, for example the amendment Calcimer® (Timac Agro, France).

The term "yeast extract" refers to the product resulting from the extraction of the contents of yeast cells. Extraction methods are widely described in the literature and are easy to implement by the person skilled in the art. The yeast extract can be a yeast hydrolysate. In the context of the invention, the yeast extract can be a yeast hydrolysate with CAS No. 8013-01-2.

The term "hydrolysate" refers to a product resulting from chemical decomposition by the direct or indirect action of water.

The term "legume extract" refers to the product resulting from the extraction of the contents of plant cells of the legume family. Extraction methods are widely described in the literature and are easy to implement by the person skilled in the art. In the context of the invention, the extract of a legume of the family Fabaceae can be a soybean extract, for example a soybean permeate.

The term "permeate" refers to the liquid that has passed through the membrane of a chemical separation process (reverse osmosis, ultrafiltration). For example, a soybean permeate refers to the liquid that has passed through the membrane of a chemical separation process from a soybean extract. The permeate can be used in liquid form or in solid form, for example as a powder. A soybean permeate can be obtained by ultrafiltration of soybean wash water as described in Plant Science Review 2011 published by David Henning, for example the soybean permeate marketed by Triballat Noyal (Noyal-sur-Vilaine, France).

The term "fertilizer substance(s)" or "fertilizer product(s)" refers to a substance, or a mixture of substances, of natural or synthetic origin, used in agriculture to promote plant growth by providing nutrients.

The term "nitrification" refers to the biological process of oxidation of ammonium ($NH_4^+$) to nitrate ($NO_3^-$).

The term "stimulation of nitrification of a soil" or "increase in nitrification of a soil" refers to an increase in the nitrate content of a soil.

The term "plant" is used in the present application to refer to the plant as a whole, including its root system, vegetative apparatus, seeds and fruits.

The present invention stems from the surprising advantages demonstrated by the inventors of the effect of a composition comprising a *Cynara* leaf extract on soil nitrification and crop yield.

Indeed, the invention relates to the use of a composition comprising an extract of *Cynara* leaves to stimulate the nitrification of a soil. Said amendment composition may also comprise one or more compound(s) selected from a calcium-based basic amendment, a yeast extract, and an extract of a leguminous plant of the family Fabaceae.

The invention also relates to a process for stimulating the nitrification of a soil, characterized in that it comprises supplying said soil with an amendment composition comprising an extract of *Cynara* leaves. Said amendment composition may also comprise one or more compound(s) selected from a calcium-based basic amendment, a yeast extract and an extract of a legume of the family Fabaceae.

*Cynara* is a genus of thistle-bearing perennials of the family Asteraceae. This genus has several species, including:

the *Cynara cardunculus* complex comprising:
- *C. cardunculus* var. *scolymus* (L.) Fiori, cultivated artichoke
- *C. cardunculus* var. *altilis* DC (=*C. cardunculus* subsp. *cardunculus*), cultivated thistle
- *C. cardunculus* var. *sylvestris* (Lamk.) Fiori, wild thistle

*Cynara syriaca* Boiss.
*Cynara cornigera* Lindely (syn. sibthornpiana Boiss. and Heldr.)
*Cynara algarbiensis* Cosson
*Cynara baetica* (Spreng.) Pau (syn. alba Boiss.)
*Cynara humilis* L.
*Cynara cyrenaica* Maire & Weiller In a preferred embodiment of the present invention, the *Cynara* is *Cynara scolymus*, more commonly known as an artichoke.

To obtain an extract from *Cynara* leaves, the whole plant can be used, but it is preferable to use the leaves. The preparation of an extract of *Cynara* leaves does not present any particular difficulty, many extraction processes are described in the prior art. The extraction process is not limited to any particular process, and the processes conventionally used are applicable for the preparation of an extract of *Cynara* leaves, for example the aqueous extraction, such as the batch mode aqueous extraction obtained by shaking.

For example, the *Cynara* leaf extracts can be obtained by a process involving the following steps: washing, grinding, extraction (solid-liquid separation) and optionally fractionation and concentration.

In a particular embodiment, the *Cynara* leaf extract is a solute of *Cynara* leaves. For example, the *Cynara* leaf extract can be obtained by aqueous extraction by mixing leaves of *Cynara scolymus* cut and/or ground to a suitable size, optionally in powder form (for example 60 sieve) with water at an appropriate temperature and for an appropriate length of time. An example of a preparation process is mixing a powder of *Cynara* leaves with water at 40° C. for 3 hours, the mixture is then filtered to recover the liquid fraction. The liquid fraction can be used as such as an extract of *Cynara* leaves or can undergo one or more subsequent treatments such as centrifugation and/or filtration.

The extract of *Cynara* leaves obtained can be more or less concentrated depending on the intended use. Total dehydration of this extract to produce a water-soluble powder can be achieved, for example, by means of a drum dryer, by spraying or by freeze-drying.

The extract of *Cynara* leaves used in the context of the present invention contains polyphenols derived from chlorogenic acid. Chlorogenic acid is a phenolic acid, ester of caffeic acid and (L)-quinic acid of formula:

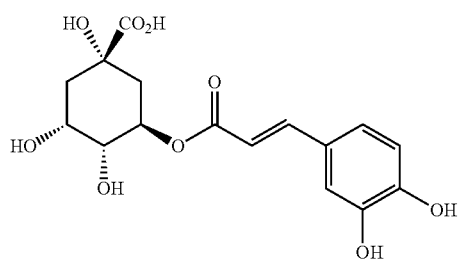 [SMILES: O=C(/C=C/c1ccc(O)c(O)c1)O[C@@H]1C[C@](O)(C(=O)O)C[C@@H](O)[C@H]1O]

The polyphenols derived from chlorogenic acid contained in the extract of *Cynara* leaves are in particulr cynarin, feruloylquinic acid (FQA), p-coumaroylquinic acid (PQA), sinapoylquinic acid, dimethoxycinnamoylquinic acid.

Advantageously, the extract of *Cynara* leaves contains an amount of polyphenol derived from chlorogenic acid greater than 10 mg of polyphenol derived from chlorogenic acid per 100 g of dry extract, for example an amount greater than 15 mg per 100 g of dry extract, greater than 20 mg, greater than 25 mg, greater than 30 mg, greater than 35 mg, greater than 40 mg, for example between 10 mg and 100 mg or between 10 mg and 50 mg of polyphenol derived from chlorogenic acid per 100 g of dry extract. The extract of *Cynara* leaves may also contain an amount of polyphenol derived from chlorogenic acid greater than 100 mg of polyphenol derived from chlorogenic acid per 100 g of dry extract, for example an amount greater than 150 mg per 100 g of dry extract, greater than 250 mg, greater than 500 mg, greater than 750 mg, greater than 1000 mg, greater than 1500 mg, and even greater than 2000 mg of polyphenol derived from chlorogenic acid per 100 g of dry extract.

The extract of *Cynara* leaves used in the present invention contains cynarin. Cynarin or dicaffeoylquinic acid is a biochemical compound (polyphenol) of formula:

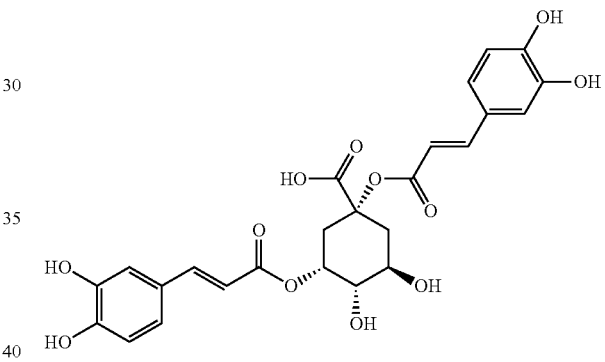

Advantageously, the extract of *Cynara* leaves contains an amount of cynarin greater than 2 mg per 100 g of dry extract, for example an amount of cynarin greater than 5 mg per 100 g of dry extract, for example an amount greater than 10 mg per 100 g of dry extract, greater than 15 mg, greater than 20 mg, greater than 25 mg, greater than 30 mg, greater than 35 mg, greater than 40 mg, for example between 2 mg and 100 mg, between 2 mg and 50 mg or between 2 mg and 6 mg cynarin per 100 g of dry extract.

In a particular embodiment, the extract of *Cynara* leaves contains at least 15 mg of polyphenols derived from chlorogenic acid, including at least 3 mg of cynarin, per 100 g of dry extract. In another particular embodiment, the extract of *Cynara* leaves contains at least 2000 mg of polyphenols derived from chlorogenic acid, including at least 40 mg of cynarin, per 100 g of dry extract.

In a particular embodiment, the extract of *Cynara* leaves is an extract of *Cynara scolymus* which has the HPLC profile shown in FIG. 1 (bottom profile).

In a particular embodiment, the amendment composition further comprises a yeast extract. The preparation of a yeast extract does not present any particular difficulty. Processes for the preparation of yeast extracts are widely described in prior art and yeast extracts are commercially available. The extraction process is not limited to a particular process, and the processes conventionally used are applicable for the preparation of yeast extract, for example aqueous extraction to obtain a yeast hydrolysate.

Advantageously, the yeast extract is a yeast hydrolysate. For example, a yeast hydrolysate can be obtained by aqueous extraction by mixing yeast with water at an appropriate temperature and for an appropriate length of time.

In a preferred embodiment, the yeast hydrolysate is the hydrolysate with CAS No. 8013-01-2. This hydrolysate, which is sold under the trade name "Celmanax®", is known to stimulate the immune system of animals. It contains oligo-polysaccharides including D-Galactosamine, D-Glucosamine, manno-oligosaccharides and beta-glucans.

The yeast extract obtained can be more or less concentrated depending on the intended use. Total dehydration of this extract to produce a water-soluble powder can be achieved, for example, by means of a drum dryer or by spraying.

Advantageously, the yeast extract according to the invention comprises at least 20 g of manno-oligosaccharides per 100 g of yeast dry extract and at least 40 g of beta-glucans per 100 g of yeast dry extract.

In a particular embodiment, the composition further comprises an extract of a legume of the family Fabaceae, preferably a soybean extract, preferably a soybean permeate. Processes for the preparation of legume extracts are widely described in the prior art. The extraction process is not limited to any particular process, and the processes conventionally used are applicable to the preparation of legume extract, for example aqueous extraction in neutral acid or alkaline medium.

The legume extract obtained can be more or less concentrated depending on the intended use. Total dehydration of this extract to produce a water-soluble powder can be achieved, for example, by means of a drum dryer or by spraying.

The composition may also include one or more fertilizer substance(s) conventionally used in agriculture. For example, the composition may also include one or more fertilizer substance(s) selected from urea, ammonium sulfate, ammonium nitrate, phosphate, potassium chloride, ammonium sulfate, magnesium nitrate, manganese nitrate, zinc nitrate, copper nitrate, phosphoric acid, potassium nitrate and boric acid, preferably one or more fertilizer substance(s) selected from urea, phosphate and potassium chloride.

Advantageously, the application of the amendment composition to the plants will be carried out by foliar or root application. Advantageously, the amendment composition is applied to the soil in liquid or solid form.

In a preferred embodiment, the amendment composition is applied to the soil in solid form and said composition includes a basic calcium amendment. In this embodiment, the amendment composition advantageously comprises at least 0.1% by weight of an extract of *Cynara* leaves relative to the total weight of the composition, for example at least 1%, 2%, 3%, 4%, 5%, for example between 0.1% and 5% by weight of an extract of *Cynara* leaves relative to the total weight of the composition. In this embodiment, the amendment composition may also include:
- at least 0.1% by weight of a yeast extract relative to the total weight of the composition, for example at least 1%, 2%, 3%, 4%, 5% and 10% preferably between 0.1% and 5% of a yeast extract relative to the total weight of the composition, and/or
- at least 0.1% by weight of a legume extract relative to the total weight of the composition, for example at least 1%, 2%, 3%, 4%, 5% and 10% preferably between 0.1% and 5% by weight of a legume extract relative to the total weight of the composition.

In a particular embodiment, the amendment composition used in the context of the present invention comprises:
- a basic calcium amendment,
- at least 0.1% by weight of an extract of *Cynara* leaves relative to the total weight of the composition, for example at least 2%, 3%, 4%, 5% w/w, for example between 0.1% and 5% by weight of an extract of *Cynara* leaves relative to the total weight of the composition,
- at least 0.1% by weight of a yeast extract relative to the total weight of the composition, for example at least 1%, 2%, 3%, 4%, 5% and 10% preferably between 0.1% and 5% by weight of a yeast extract relative to the total weight of the composition, and
- at least 0.1% by weight of a legume extract relative to the total weight of the composition, for example at least 1%, 2%, 3%, 4%, 5% and 10% preferably between 0.1% and 5% by weight of a legume extract relative to the total weight of the composition.

For example, the amendment composition used in the present invention may comprise a basic calcium amendment, 0.7% by weight of an extract of *Cynara* leaves relative to the total weight of the composition, 0.2% by weight of a yeast extract relative to the total weight of the composition and 0.5% by weight of a legume extract relative to the total weight of the composition.

When the amendment composition comprises a basic calcium amendment, said composition is preferably applied to the soil in solid form in an amount ranging from 100 kg/ha to 2000 kg/ha (kilograms/hectare), preferably ranging from 200 kg/ha to 1200 kg/ha, preferably ranging from 400 kg/ha to 800 kg/ha, preferably about 600 kg/ha. The composition is advantageously spread evenly over a field or before the plants are cultivated.

In a particular embodiment, the extract of *Cynara* leaves is applied to the soil in an amount ranging from 1 kg/ha to 50 kg/ha (kilograms/hectare), preferably from 2 kg/ha to 10 kg/ha, preferably from 4 to 5 kg/ha.

In a particular embodiment, the yeast extract is applied to the soil in an amount ranging from 0.5 kg/ha to 50 kg/ha (kilograms/hectare), preferably from 1 kg/ha to 10 kg/ha, preferably from 1 to 5 kg/ha.

In a particular embodiment, the extract of leguminous plants of the family Fabaceae is applied to the soil in an amount ranging from 1 kg/ha to 50 kg/ha (kilograms/hectare), preferably from 2 kg/ha to 10 kg/ha, preferably from 3 to 5 kg/ha.

In a particular embodiment, an extract of *Cynara* leaves containing an amount of cynarin as defined above and/or containing an amount of polyphenols derived from chlorogenic acid as defined above is applied to the soil in an amount ranging from 1 kg/ha to 50 kg/ha (kilograms/hectare), preferably ranging from 2 kg/ha to 10 kg/ha, preferably ranging from 4 to 5 kg/ha.

Although the soil treated with the amendment composition can be acidic, neutral or calcareous, the treated soil is preferably acidic soil. When the soil is acidic, the amendment composition used in the present invention advantageously comprises a basic calcium amendment which makes it possible to correct the pH of the soil. It is indeed known that the assimilation of nutrients by the plant is facilitated in a neutral pH soil.

The applicant has in fact shown that an extract of *Cynara* leaves stimulates soil nitrification. For example, the amendment composition comprising an extract of *Cynara* leaves used in the context of the present invention stimulates soil nitrification. Soil nitrification increases the amount of nutrients available in the soil and thus provides nutrients to the plant, thus meeting the growth needs of the crop, which will be expressed in particular in terms of improved yield and/or crop quality.

The amendment composition is applied to the soil in an amount sufficient to increase soil nitrification. Soil nitrification can be measured in different ways, for example by measuring the increase in soil nitrate content. The increase is understood to be in relation to soil that has not received the composition. The nitrate content is measured by an appropriate analytical method.

Advantageously, the composition is applied to the soil in an amount sufficient to increase the nitrate content of the soil by at least 10%, at least 15%, advantageously at least 20%.

The present invention finds application in the treatment of a very large variety of plants. Among these, particular mention may be made of:
- field crops such as cereals (wheat, maize),
- protein crops (peas),
- oilseeds (soybean, sunflower),
- prairie plants useful for animal feed,
- specialized crops such as market gardening (lettuce, spinach, tomato, melon), vineyards, arboriculture (pear, apple, nectarine), or horticulture (roses).

The invention also relates to an amendment composition comprising an extract of *Cynara* leaves and one or more compound(s) selected from:
- a basic calcium amendment, preferably a basic calcium amendment as described above
- a yeast extract, preferably a yeast extract as described above, and
- an extract of a legume of the family Fabaceae, preferably an extract of a legume of the family Fabaceae as described above.

Advantageously, the amendment composition is in liquid or solid form. When the amendment composition is in solid form, it preferably includes a basic calcium amendment. In a preferred embodiment, the amendment composition includes a basic calcium amendment. In this embodiment, the amendment composition advantageously comprises at least 0.1% by weight of an extract of *Cynara* leaves relative to the total weight of the composition, for example at least 1%, 2%, 3%, 4%, 5%, for example between 0.1% and 5% by weight of an extract of *Cynara* leaves relative to the total weight of the composition. In this embodiment, the amendment composition may also comprise:
- at least 0.1% by weight of a yeast extract relative to the total weight of the composition, for example at least 1%, 2%, 3%, 4%, 5% and 10% preferably between 0.1% and 5% of a yeast extract relative to the total weight of the composition, and/or
- at least 0.1% by weight of a legume extract relative to the total weight of the composition, for example at least 1%, 2%, 3%, 4%, 5% and 10% preferably between 0.1% and 5% by weight of a legume extract relative to the total weight of the composition.

In particular, the amendment composition of the present invention comprises:
- a basic calcium amendment,
- at least 0.1% by weight of an extract of *Cynara* leaves relative to the total weight of the composition, for example at least 2%, 3%, 4%, 5% w/w, for example between 0.1% and 5% by weight of an extract of *Cynara* leaves relative to the total weight of the composition,
- at least 0.1% by weight of a yeast extract relative to the total weight of the composition, for example at least 1%, 2%, 3%, 4%, 5% and 10% preferably between 0.1% and 5% by weight of a yeast extract relative to the total weight of the composition, and
- at least 0.1% by weight of a legume extract relative to the total weight of the composition, for example at least 1%, 2%, 3%, 4%, 5% and 10% preferably between 0.1% and 5% by weight of a legume extract relative to the total weight of the composition.

For example, the amendment composition of the present invention may comprise a basic calcium amendment, 0.7% by weight of an extract of *Cynara* leaves relative to the total weight of the composition, 0.2% by weight of a yeast extract relative to the total weight of the composition and 0.5% by weight of a legume extract relative to the total weight of the composition.

In a particular embodiment, the amendment composition further comprises one or more fertilizer substance(s) selected from urea, ammonium sulfate, ammonium nitrate, phosphate, potassium chloride, ammonium sulfate, magnesium nitrate, manganese nitrate, zinc nitrate, copper nitrate, phosphoric acid, potassium nitrate and boric acid.

The present invention is illustrated by the following non-limiting examples.

LEGEND FOR THE FIGURES

FIG. 1: HPLC profile showing the chlorogenic acid derivatives contained in a *Cynara scolymus* leaf extract (bottom profile) obtained on a reverse phase Ib-Sil ODS column (250 mm×4.6 mm×5 µm) (Phenomenex USA) at room temperature (18-25° C.).

Figure 2:
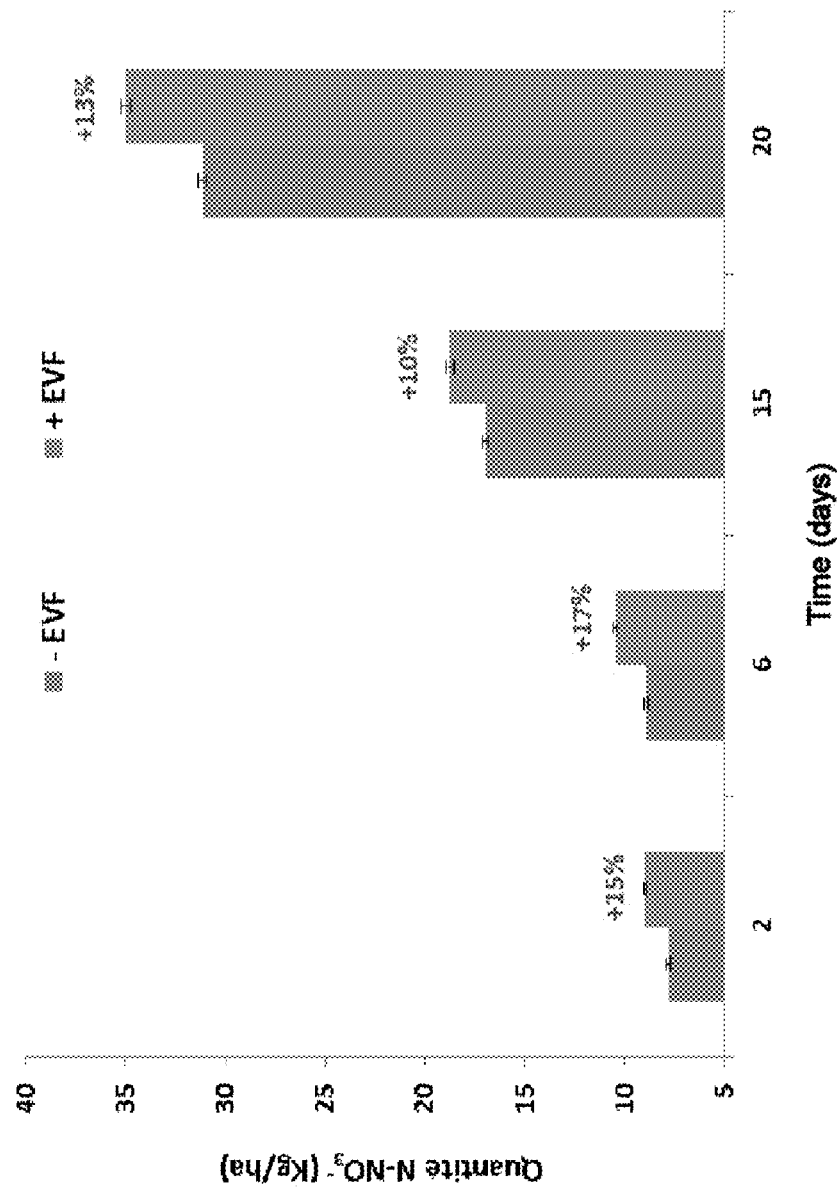

FIG. 2: A graph which represents the amount of nitric nitrogen in a soil, (i) treated with a composition comprising an extract of *Cynara scolymus* leaves (EVF), i.e. bar "+EVF" and (ii) untreated, i.e. bar "−EVF". The graph shows an increase of 15% (after 2 days of incubation), 17% (after 6 days of incubation), 10% (after 15 days of incubation) and 13% (after 20 days of incubation) in the amount of nitrate in the treated soil compared with the untreated soil.

Figure 3:
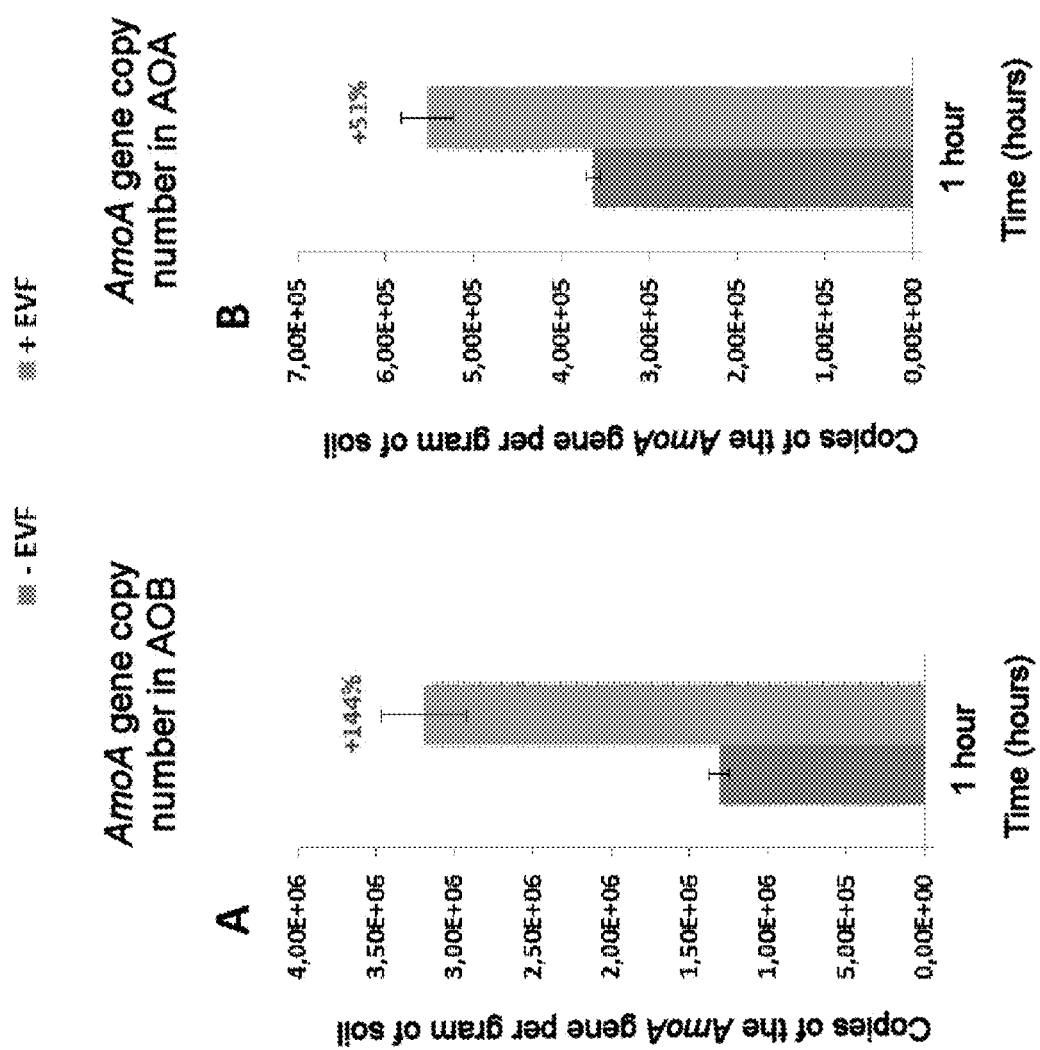

FIG. 3: A graph which represents the copy number of AmoA genes of ammonia-oxidizing bacteria (AOB; graph A) and ammonia-oxidizing archaea (AOA; graph B) in a soil, (i) treated with a composition comprising an extract of *Cynara scolymus* (EVF) leaves, i.e. bar "+EVF" and (ii) untreated, i.e. bar "−EVF". The graph shows a 144% increase (after 1 h incubation) in the number of copies of AmoA genes of the AOA bacteria, and a 51% increase (after 1 h incubation) in the number of copies of AmoA genes of the AOA bacteria in the treated soil compared with the untreated soil.

EXAMPLES

Example 1: Preparation of an Extract of *Cynara scolymus* (Artichoke) Leaves

Equipment Used

The following equipment was used:
- 10 L KGW jacketed glass reactor
- Lenz 400 mm NS29/32 glass cooling column
- Huber Unichiller 012W recirculating cooler
- PTFE stirring paddle
- IKA RW20 stirring motor
- Julabo MA immersion thermostat
- Büchner funnel Velp Scientifica JPV recirculating water vacuum pump
Fischer 200 µm nylon filter cloth
Beckman Coulter Avanti J-26 XP centrifuge
Beckman Coulter J-Lite PP-1000 bottles For Extraction The 10 L jacketed glass reactor (KGW) was equipped with an immersion thermostat (Julabo MA) to adjust the temperature of the extraction medium. The reactor was surmounted by a glass column (Lenz 400 mm NS29/32) connected to a circulation cooler (Huber Unichiller 012W). The extraction medium was stirred by a PTFE stirring paddle driven by a stirring motor (IKA RW20).

For Filtration

Büchner filtration of the extract was carried out using a recirculating water vacuum pump (yelp Scientifica JPV). The filter used was cut to the dimensions of the Büchner funnel in a 200 µm nylon filter cloth (Fischer).

For Centrifugation

An Avanti J-26 XP centrifuge and J-Lite PP-1000 bottles (Beckman Coulter) were used.

Protocols

Preparation of an Extract of *Cynara scolymus* (Extract A)

4000 g of water was introduced into a 10 L glass beaker. The water was heated to 40° C. with gentle stirring. 1000 g of artichoke leaf powder titrated in cynarin (Tortay langeais 37130-France) were added to the water under stirring. When the artichoke leaf powder was dispersed in water, the pH was around 5-6. The pH was adjusted to 7 with a 30% w/w sodium hydroxide solution (Quaron). The mixture thus obtained was maintained under stirring for 3 h at 40° C. on a VWR VMS-A IP21 magnetic hot plate stirrer.

The mixture was Büchner filtered on a 200 µm nylon filter by applying a partial vacuum with a Waston Marlow pump. The liquid fraction was recovered (filtrate) and was centrifuged at 7000 rpm at 15° C. for 20 min in a Beckman Coulter centrifuge.

The extract obtained (Extract A) after filtration was stored at −80° C. in a Liebherr Scientific ultra-low temperature vertical laboratory freezer until use.

Measurement of the Amount of Cynarin in a *Cynara* Extract (Cynarin Titration) by HPLC-UV: Example of Extract A Extract A (70 µL) was mixed with 30 µL of Tris/HCL (pH 8.75; 2 M) and 20 mg of alumina and stirred for 5 min with a magnetic stirring rod and centrifuged (10 000 g, 5 min) in a Beckman Coulter centrifuge. The precipitate containing insoluble cynarin was washed once with Milli-Q ultrapure water (1 mL).

Cynarin, soluble in acid medium, was resolubilized with 70 µL phosphoric acid (0.4 M) and then the mixture was centrifuged (10 000 g, 5 min) with a Beckman Coulter centrifuge. The cynarin remained in the supernatant.

Aliquots of 20 µL of the supernatant were injected into a Varian 9012 chromatographic apparatus comprising a 20 µL injection valve (Rheodyne USA) and a Varian 9050 ultraviolet detector and set at 316 nm. An Ib-Sil ODS reversed-phase column (250 mm×4.6 mm×5 µm) (Phenomenex USA) was used. The chromatographic protocol was performed at room temperature (18-25° C.).

The column was eluted with a water/methanol/acetic acid mixture (78.5:20:2.5, v/v/v). The mobile phase was injected at a flow rate of 1.3 mL/min. The results obtained were compared with a calibration line obtained with cynarin standard solutions. The cynarin standard solutions were obtained from a stock solution of 0.1 mg/mL cynarin prepared in a methanol/water mixture (1:1, v/v). The cynarin standard solutions that provided the calibration line were obtained by diluting the stock solution in the same methanol-water mixture (1:1, v/v).

Characterization of Extract A by HPLC-UV

Extract A consisted mainly of cynarin and other polyphenols derived from chlorogenic acid in the following proportions:

Cynarin: 41.7 mg/100 g of dry extract
Other polyphenols derived from chlorogenic acid: 2291.3 mg/100 g of dry extract
Total polyphenols derived from chlorogenic acid: 2333.0 mg/100 g of dry extract Example 2: Measuring the Stimulation of Soil Nitrification by Measuring the Increase in Soil Nitrate Content Soil Preparation 10 g of dry soil (Table 1) sieved with a sieve with a mesh diameter of 2 mm, was placed in 60 mL glass flasks to which 1 mL of water was added, this volume allowing 70% of the field capacity of the soil studied to be reached. After 1 h incubation, the treatments were applied.

TABLE 1

| Main soil characteristics | |
|---|---|
| Texture | Silty clay |
| pH | 8.2 |
| Organic matter (% by mass) | 5 |
| Cation exchange capacity (meq/100 g) | 19.2 |

Soil Treated with an Extract of *Cynara scolymus* Leaves (+EVF)

10 g of dry soil sieved with a sieve with a mesh diameter of 2 mm was placed in 60 mL glass bottles to which 1 mL of water was added, this volume allowing 70% of the field capacity of the soil studied to be reached. After 1 h incubation, 30 kg/ha of nitrogen in the form of ammonium sulfate was added. The *Cynara scolymus* leaf extract (EVF) was applied at a rate corresponding to a treatment of 1 kg/ha. The bottles were then sealed and incubated at 10° C. for up to 20 days. During this period, nitrification kinetics associated with the appearance of nitrate in soil were established by nitrate determinations at 2, 6, 15 and 20 days.

Untreated Soil (−EVF)

10 g of dry soil sieved with a sieve with a mesh diameter of 2 mm was placed in 60 mL glass bottles to which 1 mL of water was added, this volume allowing 70% of the field capacity of the soil studied to be reached. After 1 h incubation, 30 kg/ha of nitrogen in the form of ammonium sulfate was added. The vials were then sealed and incubated at 10° C. for up to 20 days. During this period, nitrification kinetics associated with the appearance of nitrate in soil were established by performing nitrate determinations at 2, 6, 15 and 20 days.

Extraction of Nitrates from the Soil

The extraction was done by adding 30 mL of pure water to the vial containing the 10 g of soil and then shaking with a rotary shaker for one hour. The vials were allowed to settle for 10 min. The supernatant was recovered and centrifuged at 11 000 rpm (rotations per minute) for 5 min at 4° C. and then filtered through a 0.25 µm filter to remove all particles.

Determination of Soil Nitrates

The nitrate content was determined by high-performance ion chromatography (HPIC, ICS 5000+). 25 µL of filtered extract was injected through an autosampler. The samples were eluted using a methane sulfonic acid solution (MSA; 20 mM) delivered by an isocratic pump system. The cations in the sample were detected, after separation, by a conductivity detector. Nitrate was quantified by calibrating the system with standard solutions.

For each of the incubation conditions (+EVF and −EVF), four batches of soil were made up (1 batch=1 biological replicate).

All the treatments were carried out systematically for each of the biological repetitions, i.e. in quadruple batches. The data obtained were presented as a mean and the variability of the results was given as the standard error of the mean for n=4. A statistical analysis of the results was performed using Student's test.

The determination of nitrate content is shown in FIG. 2.

Conclusion: Soils treated with the extract of *Cynara scolymus* leaves (+EVF) showed a significant increase in soil nitrate content: +15% (after 2 days incubation), +17% (after 6 days incubation), +10% (after 15 days incubation) and +13% (after 20 days incubation).

Example 3: Measuring the Stimulation of Soil Nitrification by Measuring the Decrease of Soil pH Soil Preparation 80 g of dry soil (Table 1) sieved with a sieve with a mesh diameter of 2 mm, was placed in 90 cm$^3$ (5.4×4×4.2 cm) Plexiglas tanks, an optode was glued to one of the transparent sides of the Plexiglas tanks to which 15 mL of water was added, this volume allowing 70% of the field capacity of the soil studied to be reached. After 24 h incubation, the treatments were applied.

Soil Treated with a *Cynara scolymus* Leaf Extract (+EVF)

80 g of dry soil (Table 1) sieved with a sieve with a mesh diameter of 2 mm, was placed in 90 cm$^3$ (5.4×4×4.2 cm) Plexiglas tanks, an optode was glued to one of the transparent sides of the Plexiglas tanks to which 15 mL of water was added, this volume allowing 70% of the field capacity of the soil studied to be reached. After 24 h incubation, the treatments were applied.

80 kg/ha of nitrogen in the form of ammonium sulfate was then added. The *Cynara scolymus* leaf extract (+EVF) was applied at a rate corresponding to a treatment of 1 kg/ha. The tanks were then placed in the dark for 13 days. Photographs of the optode were taken after 4, 5, 6, 7, 8, 9, 10, 11, 12 and 13 days using a camera connected to a computer. Each photo was then analyzed by the imaging software (VisiSens) to determine the change in pH (by measuring the change in fluorescence) during this period.

Soil not Treated with a *Cynara scolymus* Leaf Extract (+EVF)

80 g of dry soil (Table 1) sieved with a sieve with a mesh diameter of 2 mm, was placed in 90 cm$^3$ (5.4×4×4.2 cm) Plexiglas tanks, an optode was glued to one of the transparent sides of the Plexiglas tanks to which 15 mL of water was added, this volume allowing 70% of the field capacity of the soil studied to be reached. After 24 h incubation, the treatments were applied.

80 kg/ha of nitrogen in the form of ammonium sulfate was then added. The tanks were then placed in the dark for 13 days. Photographs of the optode were taken after 4, 5, 6, 7, 8, 9, 10, 11, 12 and 13 days using a camera connected to a computer. Each photo was then analyzed by the imaging software (VisiSens) to determine the change in fluorescence during this period.

The change in soil pH was visualized by the VisiSens software (photographic data not shown).

Conclusion: Soils treated with the extract of *Cynara scolymus* leaves (+EVF) showed a decrease in soil pH between 4 and 13 days of incubation, indicating soil acidification related to the stimulation of soil nitrification.

Example 3: Measuring the Stimulation of Nitrification of a Soil by Measuring the Increase in the Soil in the Copy Number of the AmoA Gene (Gene Involved in the Synthesis of the Enzyme Ammonia Monooxygenase Responsible for the Transformation of Ammonium to Nitrate)

Soil Preparation 10 g of dry soil (Table 2) sieved with a sieve with a mesh diameter of 2 mm, was placed in 60 mL glass bottles to which 1 mL of water was added, this volume allowing 70% of the field capacity of the soil studied to be reached. After 1 h incubation, the treatments were applied.

TABLE 2

| Main soil characteristics | |
|---|---|
| Texture | Silty |
| pH | 6.2 |
| Organic matter (%) | 3.6 |
| Cation exchange capacity (meq/100 g) | 8.2 |

Soil Treated with an Extract of *Cynara scolymus* Leaves (+EVF)

10 g of dry soil (Table 2) sieved with a sieve with a mesh diameter of 2 mm, was placed in 60 mL glass bottles to which 1 mL of water was added, this volume allowing 70% of the field capacity of the soil studied to be reached. After 1 h incubation, the *Cynara scolymus* leaf extract (+EVF) was applied at a rate of 1 kg/ha. The vials were then sealed and incubated at room temperature for a period of one hour. After this period, the copy number of the AmoA gene was measured by quantitative PCR.

Soil not Treated with an Extract of *Cynara scolymus* Leaves (−EVF)

10 g of dry soil (Table 2) sieved with a sieve with a mesh diameter of 2 mm, was placed in 60 mL glass bottles to which 1 mL of water was added, this volume allowing 70% of the field capacity of the soil studied to be reached. After 1 h incubation, the bottles were then sealed and incubated at room temperature for a period of one hour. After this period, the copy number of the AmoA gene was measured by quantitative PCR.

Extraction of DNA from Soil Samples

DNA was extracted from the soil samples using the Nucleospin soil extraction kit (Macherey Nagel) and following the manufacturer's instructions. For all samples, DNA was eluted in 50 µL of elution buffer.

DNA Quality Analysis

After DNA extraction and elution, the quality and concentration of the DNA was analyzed by means of Agilent Technologies' automated 4200 TapeStation System and using the "genomic DNA screentapes" software.

qPCR Analysis of the AmoA Gene Copy Number

The AmoA gene copy number was measured by qPCR using primers specific for this gene. For AOA-amoA F (SAATGGTCTGGCTTAGACG), AOA-amoA R (GCGGCCATCCATCTGTATGT) and for AOB-amoA F (GGGGTTTCTACTGGTGGT), AOB-amoA R (CCCCTTCGGGAAAGCCTTCTTC). DNA standards were created by PCR amplification of soil DNA extracts. The resulting amplicons were purified prior to quantification in the "TapeStation" system. The copy number of the target genes was calculated using the following formula:

Copy number=6.023×1023 (copies/mol)×the concentration of the standard (g/mL)/molecular mass (g/mol).

Standard curves for the AmoA gene in AOB and AOA were performed using a series of DNA dilutions ranging from 101 to 106 copies of the target gene. The standard, the DNA samples and the control were amplified in three replicates with the respective primer pairs. All reactions were performed with the Bio-Rad CFX384 real-time PCR system, with initial denaturation at 98° C. for 3 min, followed by 40 cycles at 98° C. for 15 s, 65° C. for 30 seconds and 72° C. for 50 s and final extension at 72° C. for 5 min. Each 10 µL reaction contained 1 µL of DNA and a concentration of 300 nM of each primer. The samples were quantified against the corresponding standard curve using the CFX Manager version 3.1 software (BIORAD). The final gene copy number was calculated and reported per gram of soil.

For each of the incubation conditions (+EVF and −EVF), four batches of soil were made up (1 batch=1 biological replicate).

All the treatments were carried out systematically for each of the biological repetitions, i.e. in quadruple batches. The data obtained were presented as a mean and the variability of the results was given as the standard error of the mean for n=4. A statistical analysis of the results was performed using Student's test.

The copy number of the AmoA gene in AOB and AOA is shown in FIG. 3.

Conclusion: Soils treated with the extract of *Cynara scolymus* leaves (+EVF) show a significant increase in the copy number of the AmoA gene in AOB (+144%) and AOA (+51%) after 1 hour incubation.

The invention claimed is:

1. A method for stimulating the nitrification of a soil, comprising applying to said soil an amendment composition comprising an extract of *Cynara* leaves.

2. The method as claimed in claim 1, wherein the amendment composition further comprises one or more compounds selected from the group consisting of:
   a basic calcium amendment,
   a yeast extract, and
   a legume extract from the family Fabaceae.

3. The method as claimed in claim 2, wherein the yeast extract is a yeast hydrolysate.

4. The method as claimed in claim 2, wherein the legume extract from the family Fabaceae is a soybean extract or a soybean permeate.

5. The method as claimed in claim 1, wherein the amendment composition further comprises one or more fertilizer substances selected from the group consisting of urea, ammonium sulfate, ammonium nitrate, phosphate, potassium chloride, ammonium sulfate, magnesium nitrate, manganese nitrate, zinc nitrate, copper nitrate, phosphoric acid, potassium nitrate and boric acid.

6. The method as claimed in claim 1, wherein the extract of *Cynara* leaves is an extract of *Cynara scolymus* leaves.

7. The method as claimed in claim 1, wherein the soil is acidic soil.

8. The method as claimed in claim 1, wherein the extract of *Cynara* leaves is applied to the soil in an amount ranging from 1 kg/ha to 50 kg/ha (kilograms/hectare).

9. An amendment composition comprising an extract of *Cynara* leaves and one or more compounds selected from the group consisting of:
   a basic calcium amendment,
   a yeast extract, and
   a legume extract from the family Fabaceae.

10. The amendment composition of claim 9, wherein the extract of *Cynara* leaves is an extract of *Cynara scolymus* leaves.

11. The amendment composition of claim 9, wherein the yeast extract is a yeast hydrolysate.

12. The amendment composition of claim 9, wherein the legume extract from the family Fabaceae is a soybean extract or a soybean permeate.

* * * * *

SEQUENCE LISTING

```
<160> NUMBER OF SEQ ID NOS: 4

<210> SEQ ID NO 1
<211> LENGTH: 19
<212> TYPE: DNA
<213> ORGANISM: Artificial Sequence
<220> FEATURE:
<223> OTHER INFORMATION: AOA-amoA F

<400> SEQUENCE: 1
saatggtctg gcttagacg                                                19

<210> SEQ ID NO 2
<211> LENGTH: 20
<212> TYPE: DNA
<213> ORGANISM: Artificial Sequence
<220> FEATURE:
<223> OTHER INFORMATION: AOA-amoA R

<400> SEQUENCE: 2
gcggccatcc atctgtatgt                                               20

<210> SEQ ID NO 3
<211> LENGTH: 18
<212> TYPE: DNA
<213> ORGANISM: Artificial Sequence
<220> FEATURE:
<223> OTHER INFORMATION: AOB-amoA F

<400> SEQUENCE: 3
ggggtttcta ctggtggt                                                 18

<210> SEQ ID NO 4
<211> LENGTH: 22
<212> TYPE: DNA
<213> ORGANISM: Artificial Sequence
<220> FEATURE:
<223> OTHER INFORMATION: AOB-amoA R

<400> SEQUENCE: 4
ccccttcggg aaagccttct tc                                            22
```